Figure 12:
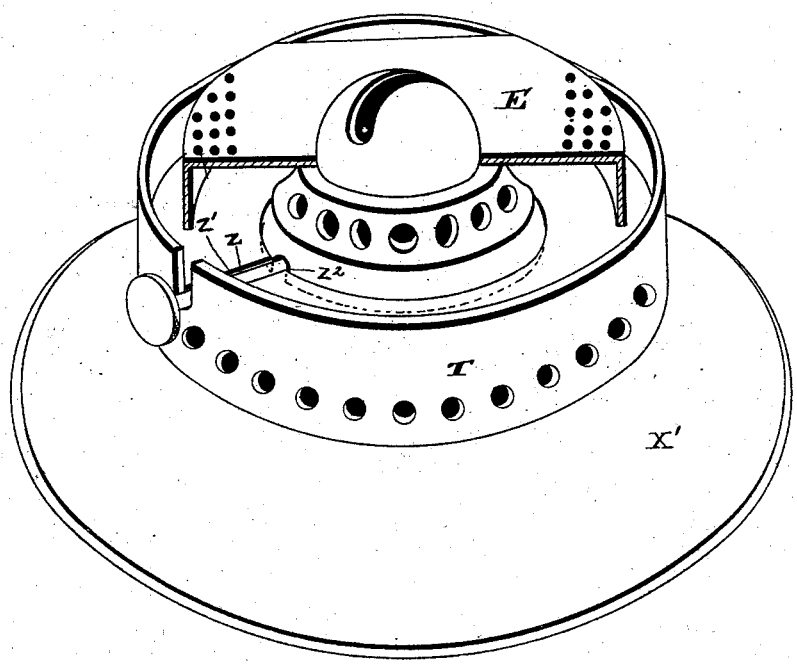

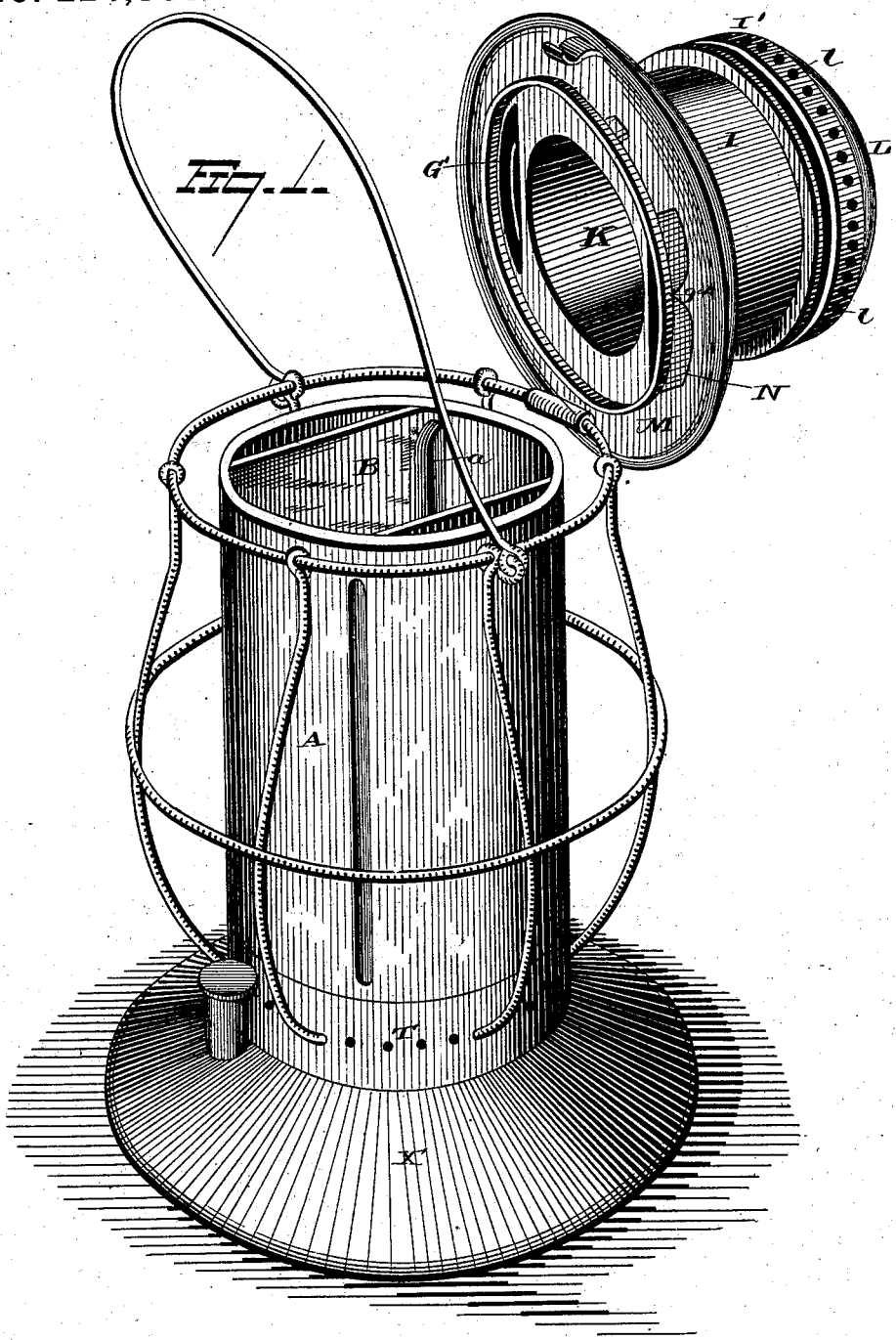

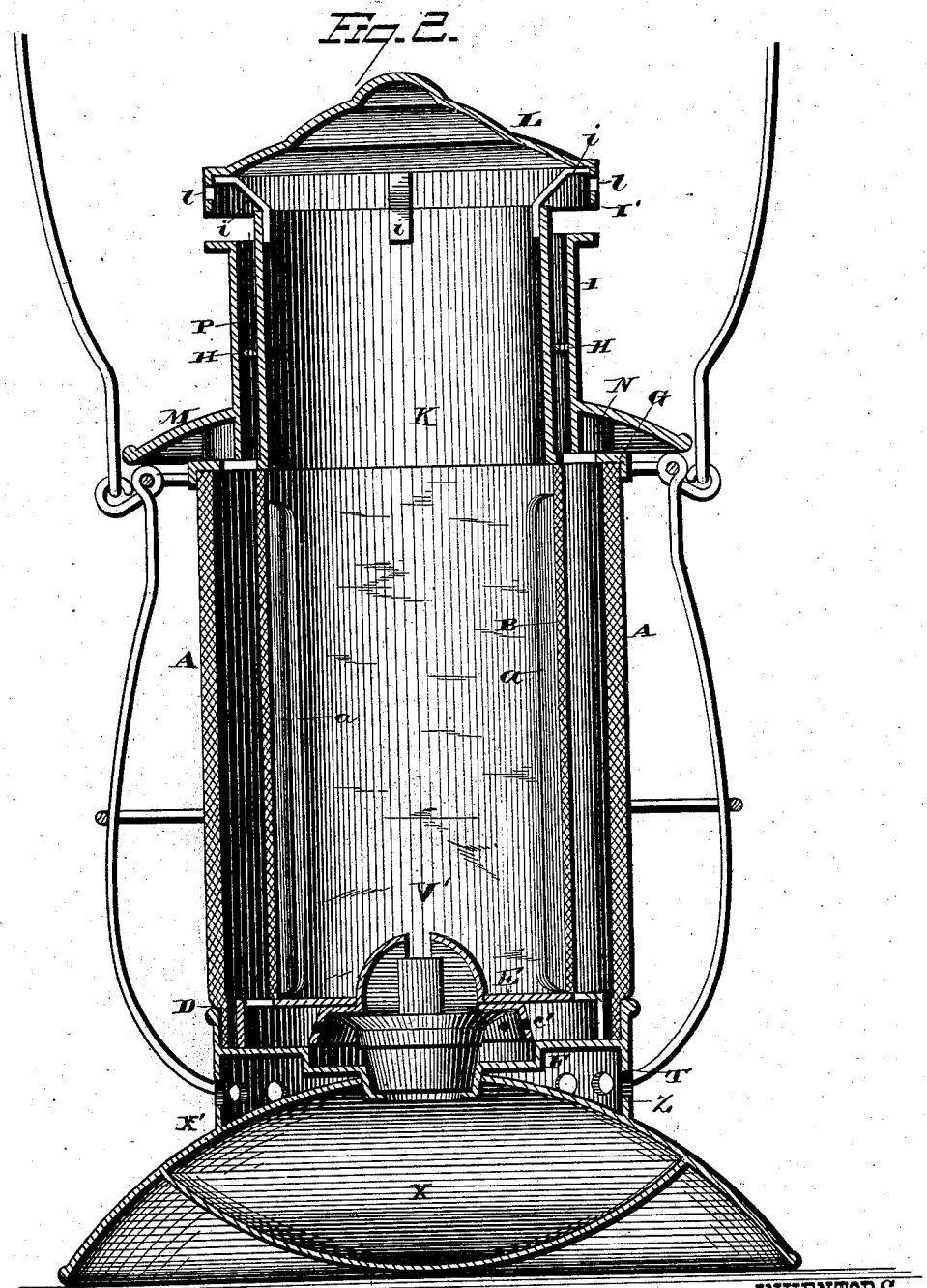

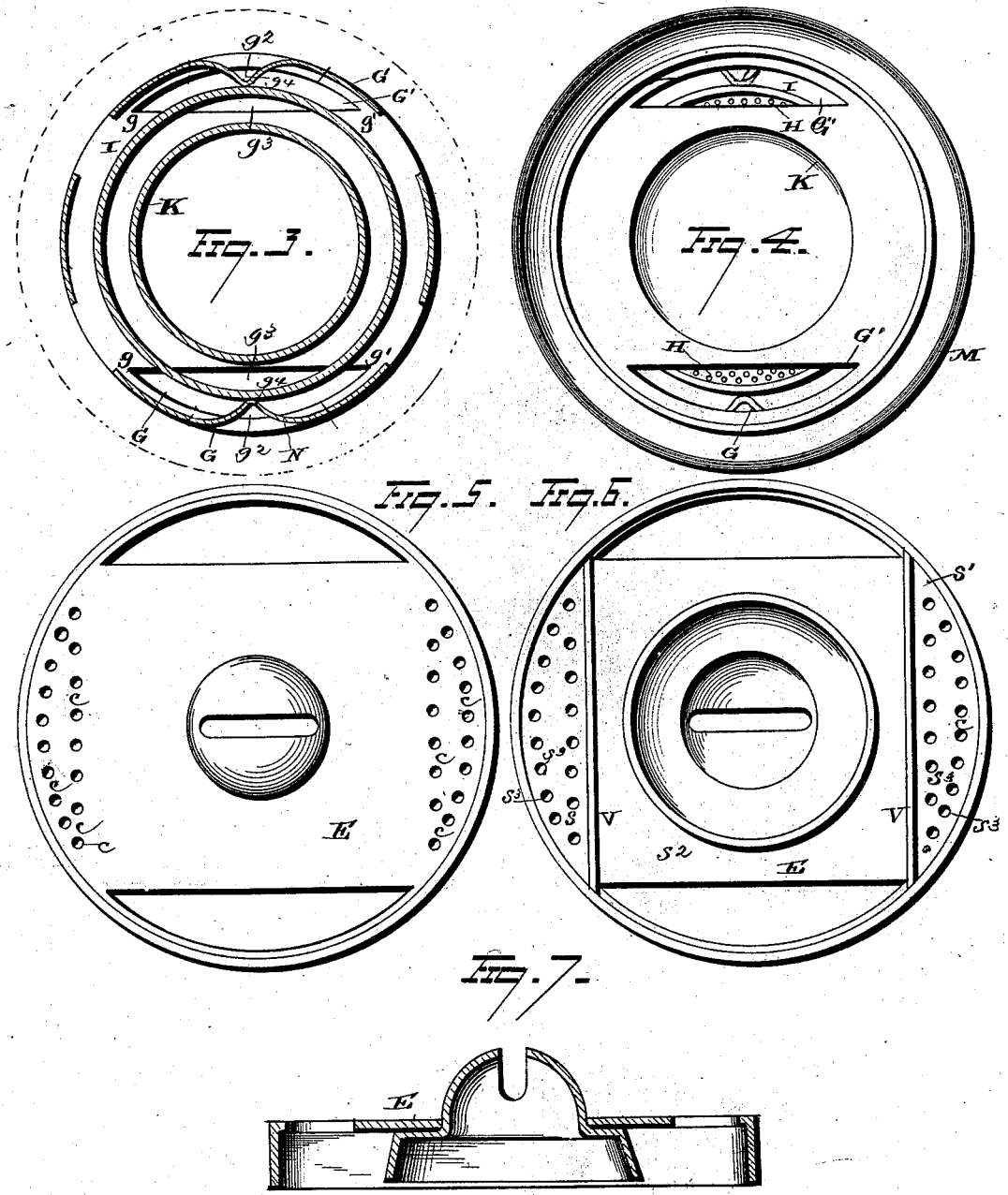

6 Sheets—Sheet 4.
J. H. EWING & E. L. BILL.
Lantern.
No. 224,888. Patented Feb. 24, 1880.
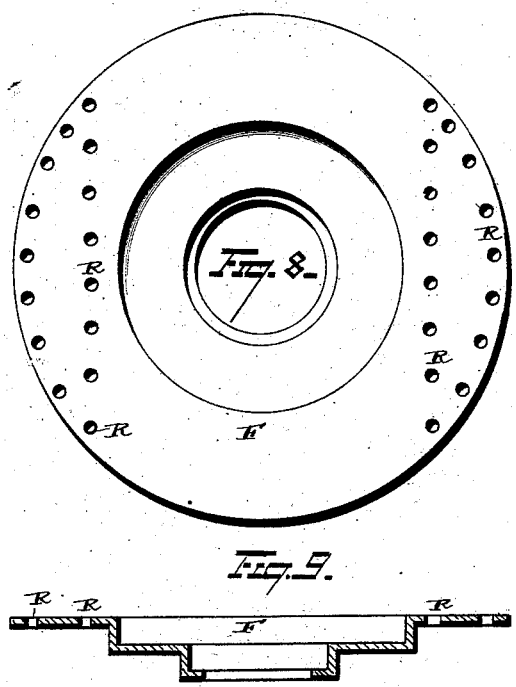
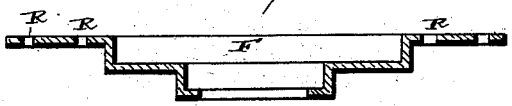
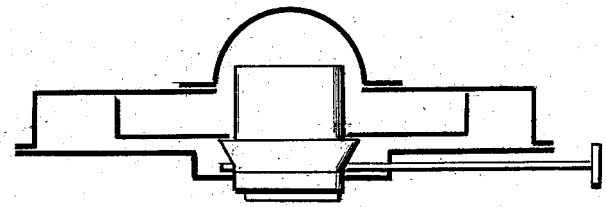
WITNESSES
E. D. Nottingham
A. W. Bright.
INVENTORS
J H Ewing
E L Bill
By H A Seymour ATTORNEY
N. PETERS, PHOTO-LITHOGRAPHER, WASHINGTON, D. C.

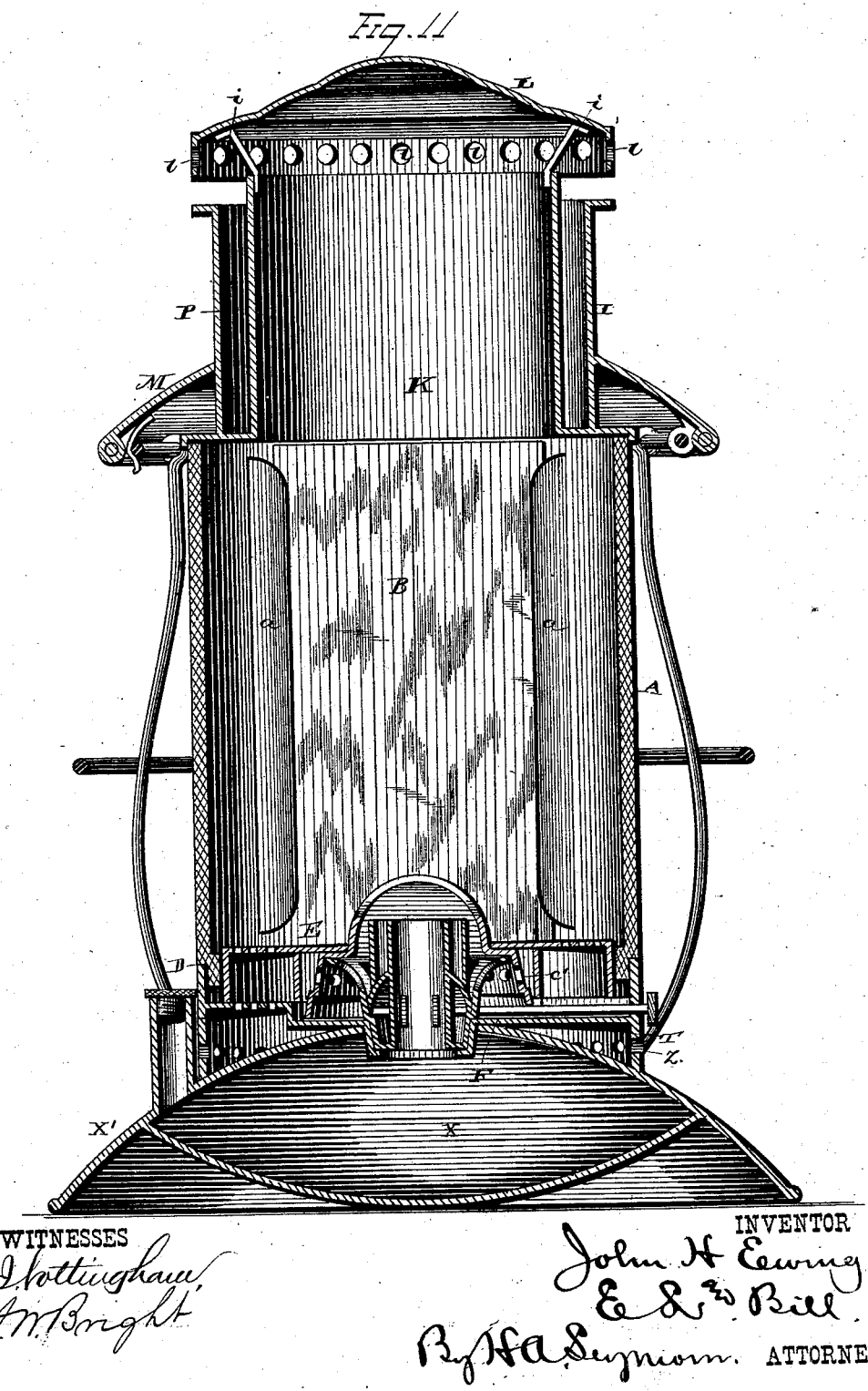

6 Sheets—Sheet 6.

J. H. EWING & E. L. BILL.
Lantern.

No. 224,888. Patented Feb. 24, 1880.

WITNESSES
E. J. Nottingham
A. W. Bright

INVENTOR
John H. Ewing
E. L. Bill
By H. A. Seymour, ATTORNEY

UNITED STATES PATENT OFFICE.

JOHN H. EWING AND EDWARD L. BILL, OF WHEELING, WEST VIRGINIA.

LANTERN.

SPECIFICATION forming part of Letters Patent No. 224,888, dated February 24, 1880.

Application filed December 20, 1879.

*To all whom it may concern:*

Be it known that we, JOHN H. EWING and EDWARD L. BILL, of Wheeling, in the county of Ohio and State of West Virginia, have invented certain new and useful Improvements in Lanterns; and we do hereby declare the following to be a full, clear, and exact description of the invention, such as will enable others skilled in the art to which it pertains to make and use it, reference being had to the accompanying drawings, which form part of this specification.

Our invention relates to an improvement on the lantern for which Letters Patent were granted to us dated December 10, 1878, and numbered 210,602.

The object of our invention is to improve the construction of the lantern, to cheapen and simplify the several parts, and provide for a steady and regular supply of air to support the combustion regardless of the varying positions to which the lantern or lamp may be subjected when in actual use.

Our invention consists, first, in the combination, with an oil-reservoir having a perforated flange secured to its upper portion and a globe provided with slides forming air-passages therein, the lower end of the globe extending below the lower ends of the slides, and constituting the periphery of an air-chamber, of a burner-cap bed provided with a depending flange on its outer edge, and subdivided on its under side into separate and independent air-chambers by means of depending strips, the ends of which are connected with the outer flange, the upper plate of the burner-cap bed having perforations formed therein through which air is supplied to the globe, and also provided with openings for conducting the air to the cone of the burner from the air-passages in the globe.

Our invention further consists in the combination, with an oil-reservoir having a perforated burner-bed located over its upper portion, forming an intervening air-chamber, said burner-bed encircled by an upwardly-projecting flange, and a globe furnished with slides forming air-passages, the lower end of the globe extending below the lower ends of the slides and forming the periphery of an air-chamber, of a burner-cap bed provided with separate air-chambers, through which the outer air is supplied to the globe from the lower portion of the lamp or lantern, and to the burner from the upper portion of the same.

Our invention further consists in the combination, with a globe provided with removable slides arranged to constitute air-passages in the globe, of a burner-bed located over the top of the oil-reservoir, and forming a base for the lower end of the globe, said burner-bed formed with a central opening for the burner, and a radial groove for the reception of the ratchet-shaft, thereby allowing the lower end of the globe to be seated on said burner-bed.

Our invention further consists in the combination, with a globe or cylinder provided with or in combination with air-passages, however formed, of a chimney attached to the globe cap or plate, a collar surrounding the chimney and extending through the reflector to the top of the globe-cap, said collar dividing the openings in the cap-plate; the combination of the chimney and collar, forming an air-induction space between them, extending from above and through the reflector, said air-space divided by a perforated ring at or near the line of the reflector, the object of said ring being to divide the air-space into two parts, to break up the incoming blasts of air admitted to said space from above the reflector, as more fully hereinafter described.

Our invention further consists of the combination, with a globe provided with air-passages, of the cap covering the same, said cap having an aperture in the center to admit the chimney and a suitable number of openings at its sides to register with the air-passages in the globe, and of a perforated, indented, or broken band surrounding the edge of the globe-cap and extending from the edge of the same to the under side of the reflector, forming an air-inlet into the air-space between the outside of the collar and indented band from the under side of the reflector. The band around the edge of the globe-cap may be cut away in places, leaving only enough to support and hold the parts in place; or the band may be so indented as to divide the air-openings in the cap-plate, leaving the air-passages partially open, as will be more fully hereinafter described.

Our invention further consists in other details of construction and combinations of parts, as will hereinafter appear from the following description and claims.

In the accompanying drawings, Figure 1 is a view of the lantern in perspective, with the top turned back to show the form and construction of globe-cap with the air-inlets between it and the under side of the reflector. Fig. 2 is a vertical section of the improved lantern. Fig. 3 is a top view of the globe-cap, showing line of chimney and collar, together with the indented and cut-away band, dividing the air-openings and attaching the cap-plate to the reflector. Fig. 4 is the bottom view of the same. Fig. 5 is the top view of the burner-cap bed, showing air-openings to register with air-passages in the globe, also perforations to admit air from chambers beneath. Fig. 6 is the bottom view of burner-cap bed, with dividing-partitions and cone. Fig. 7 is a sectional view of same. Fig. 8 is top view of burner-bed, with recess for burner and ratchet and openings to chamber beneath. Fig. 9 is sectional view of burner-bed. Fig. 10 is a modification of lower-cap bed, in combination with burner-bed. Fig. 11 is a vertical section taken through the line $x\ x$, Fig. 2. Fig. 12 is a view, in perspective, of the oil-reservoir with a portion of the burner-cap bed cut away to illustrate the construction of parts more clearly.

A designates the glass cylinder of the lantern, which is provided with vertical shoulders $a$, of any desired number and form, and provided with slides B, of the same or different color, the latter being formed of metal or any opaque material, if desired, but preferably formed of colored glass—as, for instance, green and red, or other colors, the same being described in our former patent, numbered 210,602.

K represents the chimney, which latter is of less diameter than the cylinder A. A collar, I, encircles the chimney, said collar being of greater diameter than the latter, to form an annular intervening space, said collar extending down to the globe-cap G, and having a reflector, M, secured to its periphery a short distance above its lower end.

N represents a band having its upper edge secured to the under side of the reflector and its lower edge secured to the outer edge or periphery of the globe-cap, said band being inwardly converged at its central portion, $g^4$. The band N serves to form two separate and independent air-passages, $g\ g'$, leading from the outside of the collar I to the central portion of the opening G' in the globe-cap, whereby there are formed four distinct and independent passages, $g$, $g'$, $g^2$, and $g^3$, through which air is received and conveyed to the air-passages formed between the cylinder and slides of the lantern, and at the same time preventing any cross-currents from exhausting the air from said passages by any motions whatsoever that may be given to the lantern.

L is the chimney-cap, being secured above the top of the chimney by suitable braces $i$, which may be secured to the chimney or its encircling-collar. The outer edge of the cap is provided with a depending flange, I', having perforations $l$ formed therein. This flange serves to break up the currents of air received between the chimney and collar, and, in connection with the upper end of the chimney, prevents the wind from blowing down the air-space between the collar and chimney.

Within the annular air-induction passage P, formed between the chimney and collar, is placed an annular perforated plate, H, which is preferably located at about half-way between the upper and lower ends of the chimney, said plate serving to prevent the air from taking a circular course and forming cross-currents across the air-openings $g$, $g'$, $g^2$, and $g^3$, and induces the air to flow downward in vertical streams through said air-passages.

The foot or base of the lantern is provided with an oil-receptacle, X, located beneath the arch X'.

A burner-bed, F, rests at its central portion on the top of the arched portion X' of the oil-receptacle, thereby forming an intervening air-space between the burner-bed and upper surface of the arch X'. The central portion of the burner-bed is provided with an opening to the burner-collar, by means of which the burner-bed is attached to and registers with the burner-opening in the top of the arch X' of the oil-receptacle.

A perforated band, T, extends upward from the arch X' and has the periphery of the burner-bed secured thereto, the band being formed to extend a short distance above the burner-bed to constitute a flange for the reception and retention of the shoulder D on the lower end of the globe or cylinder A of the lantern, and also serves as a suitable ring for the attachment of the bottom of the guard, or the latter may, if desired, be secured to an independent ring, which, in turn, could be secured to the perforated ring by means of a bayonet or other suitable fastening.

To the top of the lantern-guard is hinged the reflector M, and held in place by a suitable clasp-spring.

The burner-bed F is provided with suitable perforations, as shown at R, which form a communication between the air-chamber Z, formed between the arch X' and under side of the burner-bed, and the upper side of the latter.

E represents the burner-cap bed, having air-openings $c\ c$ formed therein of the form of, and adapted to register with, the air-passages in the globe or cylinder of the lantern, the air flowing downward through the air-passages in the globe through openings $c\ c$ and through the perforations $c'$ in the burner-cap to the burner.

To the lower or under side of the burner-cap plate are secured the depending flanges or partitions V V, which operate to divide the lower portion of the burner-cap into three separate chambers, $s\ s'\ s^2$. The chambers $s\ s'$ have perforations $s^3$, which communicate with the flame-chamber V' of the lantern. When the burner-bed cap is secured in its proper position above the burner-bed F the perforations R allow air to flow from the chamber Z into the chambers $s\ s'$, and from thence, through the perforations $s^3$, to the flame-chamber $V'$ of the lantern.

From the foregoing description it will be observed that the air supplied to the flame in our improved lantern is furnished from three separate and distinct points in the combination of the various parts:

First, through the air-induction space between the collar and the chimney, direct to the air-passages in the globe, said air-passages being divided by the annular collar at the openings in the globe-cap. This collar, reaching to the top of the globe-cap, prevents the air from passing out under the reflector.

Second, the air is received under the reflector and conducted to that part of the openings in the globe-cap outside of the annular collar, and is prevented from flowing up and out at the top by means of the lower end of the collar forming an additional air-space surrounding the top of the globe. These parts, taken in combination with the bottom of the reflector and outside band, reaching from the edge of the globe-cap to the under side of the reflector, all the air received into the first and second named inlets is conducted directly to the air-passages in the globe formed by the combination of the slides and the globe direct to the middle division of the air-space under the burner-cap bed. From thence it flows direct to the under side of the cone of the burner.

Third, the air received at the bottom of the lantern is all directed to the flame-chamber outside of the cone of the burner. It is first received through the perforations in the band below the line of the bottom of the globe. It then passes through the perforations in the burner-bed into the subdivided air-chamber under the burner-cap bed, and through the perforations or openings the air is distributed over the bottom of the flame-chamber outside of the burner-cone; hence the air received at the bottom of the lantern must necessarily pass through three lines of perforations, and is divided by passing into the separate chambers under the burner-cap bed before it reaches the flame. This division of the air-recess effectually breaks up any strong blasts of air or wind that may strike the lantern, and permits the currents to flow into the flame-chamber from the bottom in such a manner as not to materially disturb the flame or cause its extinguishment. The divided burner-cap bed-chamber also prevents the air from being exhausted or drawn out of the flame-chamber by any rapid motion given to the lantern, or by strong blasts of wind passing through the perforated band and under the burner-bed. The flame-chamber thus receives its air from the bottom opposite the side from which the wind strikes and has time to recover from the blast and prevent the extinguishment of the flame.

The chimney-cap is made with a depending flange, which may be perforated to allow the free exit of hot air. The advantages of the flange are that, in combination with the perforated ring inside and between the collar and chimney, the wind is prevented from blowing down the air-space or circling around in the said space and driving the air from the air-spaces in the globe.

The guard is provided with ears to which we fasten the bail. The top is hinged to the guard and kept closed by an ordinary spring-catch.

The burner-bed plate is provided with a groove or elongated indenture, $z$, to receive the ratchet-wheel shaft $z'$, and thereby permit the globe to be seated upon the top of the burner-bed plate without forming a slot in the globe-shoulder. The lower edge of the cone is provided with a recess, $z^2$, within which is received the ratchet-wheel shaft $z'$.

We do not wish to confine ourselves to this particular shape of globe or cylinder, as air-passages formed inside of any shaped globe by the means of detachable slides of any form, or two cylinders, one inside of the other, forming an air-passage between them, or of a globe with inside chimney, the combination of any of the above globes and chimneys forming air-passages inside of the outer globe, will work equally well in combination with the top and bottom of the lantern, as described; or, if desired, the globe or cylinder may be made with bull's-eye blown in its sides, or the sides may be ribbed or fresneled to assist in radiating the light.

If desired, the depending strips between the burner-cap bed and burner-bed may be connected with each other in any convenient manner to effectually divide the chamber into independent parts, and the parts may be so arranged and connected that the burner may be held securely in place without the intervention of the cone between the burner-cap bed and burner-bed. For instance, as shown in modification, the cone may rest on the top of the burner-cap bed instead of passing through the central aperture.

Having fully described our invention, what we claim as new, and desire to secure by Letters Patent, is—

1. The combination, with an oil-reservoir provided with an upward-projecting flange having perforations formed therein and a globe furnished with slides (one or more) forming air-passages, the lower end of the globe extending below the lower ends of the slides and forming the periphery of an air-chamber, of a burner-cap bed provided with a depending outer flange, and subdivided on its under side into separate compartments by means of the depending strips, the ends of which are attached to the outer flange, the upper portion of the burner-cap bed being provided with air-passages through which the outer air is supplied to the globe, and also provided with openings, through which air is conducted to the burner from the air-passages in the globe, substantially as set forth.

2. The combination, with an oil-reservoir having a burner-bed located over the same and forming an intervening air-chamber, said burner-bed provided with air-passages and encircled by an upward-projecting flange, and a globe furnished with slides forming air-passages, the lower end of the globe extending below the lower end of the slides and forming the periphery of an air-chamber, of a burner-cap bed provided with separate and independent air-chambers, through which outer air is supplied to the globe from the lower portion of the lantern and to the burner from the upper portion of the lantern, substantially as set forth.

3. The combination, with an oil-reservoir having a perforated burner-bed permanently secured thereto and an air chamber or passage formed between the oil-reservoir and burner-bed, of a burner-cap bed having the burner-cap secured thereto, said burner-cap bed provided with a flange around its edge which seats upon the burner-bed, and furnished with partitions forming separate and independent air-chambers, substantially as set forth.

4. The combination, with an oil-reservoir having a perforated burner-bed plate secured thereto and an air-chamber formed between the oil-reservoir and burner-bed plate, of a burner-cap bed-plate constructed to rest upon the burner-bed plate and located within the lower end of the globe, said burner-cap bed-plate provided with openings which register with air-passages in the globe, and with air-passages for admitting air into the flame-chamber of the globe, substantially as set forth.

5. The combination, with the burner-cap bed and burner-bed, of an indenture in the latter to permit the ratchet-wheel shaft of the burner to pass under the bottom edge of the globe to the outside of the band, the burner-bed formed with a central aperture for the burner, and a recess to allow the cone to register with the ratchet-wheel shaft, substantially as set forth.

6. The combination, with a globe or cylinder having air-passages in said globe, of a globe-cap with central aperture for chimney and slots or perforations to register with the air-passages in said globe, of a depending flange to said cap, and an indented, perforated, or broken band surrounding the same and extending from the edge of said globe-cap to the reflector, said band forming an air-inlet to that portion of the air-passages in the globe outside of the collar surrounding the chimney, substantially as set forth.

7. The combination, with the globe-cap, chimney, and collar surrounding the latter, forming an air-space between the collar and chimney, of a perforated band dividing said air-space at or near the line of the top of the reflector, the outside collar extending through the reflector to the globe-cap and dividing the slots or air-passages in the globe-cap, substantially as set forth.

8. The combination of the chimney, collar, and perforated band dividing the air-space between chimney and collar, said air-space extending to the top of the globe-cap, and the perforated, indented, or broken band surrounding the edge of the globe-cap, extending to the reflector, and forming the periphery of an air-induction space between said band and the lower end of the collar surrounding the chimney, thus dividing the slots or openings in the globe-cap that register with the air-passages in the globe into two or more parts, substantially as set forth.

9. The combination, with the globe-cap, and the air-induction space above the same, of the subdivided air-inlet under the reflector, and the subdivided air-space between the collar and chimney, forming two separate inlets to the air-passages at the top of the globe, substantially as set forth.

In testimony that we claim the foregoing we have hereunto set our hands this 16th day of December, 1879.

JOHN HENRY EWING.
EDWARD LIVINGSTON BILL.

Witnesses:
C. J. RAWLING,
W. C. PENDLETON.